(12) United States Patent
Das et al.

(10) Patent No.: US 11,799,889 B2
(45) Date of Patent: Oct. 24, 2023

(54) WEB SERVICE USAGE ANOMALY DETECTION AND PREVENTION

(71) Applicant: INTUIT INC., Mountain View, CA (US)

(72) Inventors: Debasish Das, San Jose, CA (US); Guoli Sun, Mountain View, CA (US); Deepesh Ramachandran Vijayalekshmi, Santa Clara, CA (US); Venkatesh Ravichandran, Mountain View, CA (US); Salil Deshmukh, Union City, CA (US); Archana Kataria, Los Altos, CA (US)

(73) Assignee: INTUIT, INC., Mountain View, CA (US)

(*) Notice: Subject to any disclaimer, the term of this patent is extended or adjusted under 35 U.S.C. 154(b) by 213 days.

(21) Appl. No.: 16/731,486

(22) Filed: Dec. 31, 2019

(65) Prior Publication Data

US 2021/0203680 A1 Jul. 1, 2021

(51) Int. Cl.
*H04L 9/40* (2022.01)
*H04L 41/22* (2022.01)
*G06F 18/214* (2023.01)

(52) U.S. Cl.
CPC ........ *H04L 63/1425* (2013.01); *G06F 18/214* (2023.01); *H04L 41/22* (2013.01); *H04L 63/1416* (2013.01); *H04L 63/20* (2013.01)

(58) Field of Classification Search
CPC . H04L 63/1425; H04L 41/22; H04L 63/1416; H04L 63/20; G06K 9/6256
See application file for complete search history.

(56) References Cited

U.S. PATENT DOCUMENTS

| | | | |
|---|---|---|---|
| 10,459,827 B1* | 10/2019 | Aghdaie | G06F 11/0751 |
| 2018/0159871 A1* | 6/2018 | Komashinskiy | H04L 63/1416 |
| 2018/0375886 A1* | 12/2018 | Kirti | H04L 41/28 |
| 2020/0128047 A1* | 4/2020 | Biswas | H04L 67/10 |
| 2020/0285737 A1* | 9/2020 | Kraus | G06F 21/552 |

* cited by examiner

*Primary Examiner* — Suraj M Joshi
*Assistant Examiner* — Jaren Means
(74) *Attorney, Agent, or Firm* — Patterson + Sheridan, LLP (57) ABSTRACT

Certain aspects of the present disclosure provide techniques for detecting and preventing web service usage anomalies. Embodiments include forecasting, based on a model, a number of resource instances for one or more web services for a time period. Embodiments include receiving, after the time period has elapsed, a detected number of resource instances for the one or more web services for the time period. Embodiments include comparing the detected number of resource instances to the forecasted number of resource instances. Embodiments include determining, based on the comparing, a usage anomaly. Embodiments include determining an impact of the usage anomaly. Embodiments include outputting an indication of the usage anomaly and the impact of the usage anomaly.

20 Claims, 6 Drawing Sheets

WEB SERVICE USAGE ANOMALY DETECTION AND PREVENTION

INTRODUCTION

Aspects of the present disclosure relate to techniques for detecting and preventing usage anomalies in web services. In particular, embodiments described herein involve comparing near real time usage data to usage data that is forecasted using a trained model in order to detect and prevent anomalies.

BACKGROUND

The use of web services is increasing in computing environments. Web services are computing applications that are accessed by computing devices over a network, such as the Internet, such as applications that run on web servers and are accessed remotely from client devices. As entities such as businesses begin to run larger numbers of web services, the need for efficient tracking and management of web service usage has grown. Some web services involve costs that are based on usage amounts. Accordingly, anomalies such as unexpectedly high usage amounts, which may be due to mistakes or failures, can result in unexpectedly high costs.

Some web service providers bill customers at regular intervals (e.g., monthly) and a customer may not realize that their usage has increased until they receive a surprisingly high bill from a web service provider. In cases where the higher usage was unintentional, the higher costs may lead to customer dissatisfaction and discontinued use of web services. Furthermore, if not caught until a monthly bill is received, unintentionally high usage could continue for extended periods of time. When the unintentionally high usage is due to a bug or failure, successful operation of web services could also be impacted.

Accordingly, there is a need in the art for improved detection and prevention of web service usage anomalies.

BRIEF SUMMARY

Certain embodiments provide a method for detecting and preventing web service usage anomalies. The method generally includes: forecasting, based on a model, a number of resource instances for one or more web services for a time period; receiving, after the time period has elapsed, a detected number of resource instances for the one or more web services for the time period; comparing the detected number of resource instances to the forecasted number of resource instances; determining, based on the comparing, a usage anomaly; determining an impact of the usage anomaly; and outputting an indication of the usage anomaly and the impact of the usage anomaly.

Other embodiments provide a non-transitory computer-readable medium comprising instructions that, when executed by one or more processors of a computing system, cause the computing system to perform a method for detecting and preventing web service usage anomalies. The method generally includes: forecasting, using a model, a number of resource instances for one or more web services for a time period; receiving, after the time period has elapsed, a detected number of resource instances for the one or more web services for the time period; comparing the detected number of resource instances to the forecasted number of resource instances; determining, based on the comparing, a usage anomaly; determining an impact of the usage; and outputting an indication of the usage anomaly and the impact of the usage.

Other embodiments provide a system comprising one or more processors and a non-transitory computer-readable medium comprising instructions that, when executed by the one or more processors, cause the system to perform a method for detecting and preventing web service usage anomalies. The method generally includes: forecasting, based on a model, a number of resource instances for one or more web services for a time period; receiving, after the time period has elapsed, a detected number of resource instances for the one or more web services for the time period; comparing the detected number of resource instances to the forecasted number of resource instances; determining, based on the comparing, a usage anomaly; determining an impact of the usage anomaly; and outputting an indication of the usage anomaly and the impact of the usage anomaly.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for detecting and preventing web service usage anomalies.

Techniques described herein involve using a trained forecasting model to forecast a time series of usage data for one or more web services and then comparing actual detected usage data to the forecasted time series in near real time in order to detect and prevent usage anomalies. Training and using a forecasting model to forecast time series data based on historical data is described in detail in co-pending U.S. patent application Ser. No. 16/212,601, entitled "FINITE RANK DEEP KERNEL LEARNING FOR ROBUST TIME SERIES FORECASTING AND REGRESSION," and filed on Dec. 6, 2018 (hereinafter, "the '601 application), the contents of which are incorporated by reference herein in their entirety. The forecasting model used in embodiments of the present disclosure may, for example, be a finite rank deep kernel learning model as described in the '601 application.

In one example, a user deploys a web service, provided by a web service provider, in a computing environment. The web service provider may provide "compute instances," which are essentially virtual machines or virtual servers with specific resource configurations, on which the web service is executed. The customer may request a certain number of compute instances and/or may specify conditions under which the number of compute instances should be adjusted, and may be billed based on the number of compute instances used in a given time period. In some embodiments, the number of compute instances provided to a customer is dynamically scaled by the web services provider based on real time conditions, such as based on customer-specified conditions. Customer-specified conditions may include, for example, a number of requests per second issued to the web service, other conditions related to load, and the like. While some embodiments are described with respect to compute instances, alternative embodiments may involve storage instances, which are virtual machines or virtual storage entities with specific resource configurations, on which data related to the web service is stored. Compute instances and storage instances may both be referred to herein as resource instances.

In some embodiments, usage data, such as numbers of resource instances in use at a given time, is tracked by the web service provider and the customer. In one example, the web service provider generates a cost usage report (CUR) at regular intervals (e.g., weekly) indicating the costs incurred by the customer based on the number of resource instances used. The customer may also track the number of resource instances, such as via a usage tracking service, and this data may be available in real time or at more frequent intervals than the CURs are available (e.g., hourly). In some embodiments, the usage data tracked by the customer is referred to as "near real time" data, as it is available either in real time or at frequent intervals, such as hourly.

The CURs and the near real time data may be collected on an ongoing basis and used to train a forecasting model. In some embodiments, training data is generated from the CURs and near real time data by extracting temporal features (e.g., day of the week, month, week of the year, etc.) and autoregressive features (e.g., number of resource instances for each application and environment) and merging the features from the CURs and the near real time data into a single training data set. The forecasting model may be trained in batch mode based on the training data, such as using ninety days of hourly resource instance counts for each application and environment combination. In some embodiments, the model is re-trained at regular intervals, such as weekly. The re-trained model may be used to replace the existing model if, for example, a number of model quality metrics are above a threshold for the re-trained model. Model quality metrics may include, for example, negative log-likelihood and normalized root mean squared error (NRMSE).

The trained forecasting model is used at regular intervals to forecast future usage data. In one embodiment, every time a new batch of near real time data is available, such as hourly, the near real time data is pre-processed to extract features, and then the features are provided as input data to the forecasting model to forecast usage data for the next interval, such as the next hour. In certain examples, forecasts are performed hourly while training is performed weekly. Forecasts are generally based on near real time data rather than CURs, as the CURs are not available as frequently.

In some embodiments, at a time instance t (t being the point in time for which the inference is being made), the appropriate model is loaded to match the application (e.g., web service) and environment (e.g., network) combination for which an inference is sought. Then resource instance counts from time instances t–k, t–(k–1), t–1 are extracted from the near real time data, where k is a parameter for a time window (e.g., a number of hours). In an example, the model requires k hours of autoregressive inputs along with corresponding temporal inputs. 20 hourly sets of near real time data (e.g., k=20) prior to the time t are provided as inputs to the model. These inputs are used by the model to forecast the expected number of resource instances at time t along with an upper bound and a lower bound. In some embodiments, the upper bound is the predicted maximum number of resource instances used at time t and the lower bound is the predicted minimum number of resource instances used at time t.

Near real time data (e.g., the actual detected values) for time t, it is compared to the upper bound and lower bound output by the forecasting model in order to determine whether an anomaly has occurred. Any actual resource instance count that is greater than the upper bound or less than the lower bound output by the forecasting model is considered an anomaly.

Once an anomaly is identified, remedial action may be taken. For instance, an alert or indication of the anomaly, along with details of why the anomaly was determined, may be displayed via a user interface. In another example, an alert may be provided via email and/or via a collaborative platform such as an instant messaging or chat platform. Recipients of the alert may include one or more owners of the web services to which the alert relates. In some embodiments, the recipient list for alerts is customizable.

Alerts may include a link to view a visualization related to the alert, such as a graphical representation of the forecasted resource instance counts and upper/lower bounds, as well as the near real time data overlaid on the forecasted values. Alerts may also allow feedback to be provided. In one example, an alert includes a link to a feedback collection tool, where a web service owner can enter feedback indicating whether the detected anomaly is a false positive and, in some cases, whether a specified event (e.g., load testing, deployment, or marketing campaign) was occurring during the time period (e.g., as an explanation for why the unusual resource instance count is not actually an anomaly). The feedback may be used to improve future anomaly detection, such as by creating rules based on the feedback.

In one example, if feedback indicates that a detected anomaly was a false positive because load testing was occurring, a rule may be generated specifying that, in the future, if context information received from a metadata service associated with the web service indicates that load testing is occurring, then seemingly anomalous resource instance counts should be ignored (e.g., alerts should not be generated if the actual resource instance counts exceed the forecasted upper bound). Context information may include, for instance, test user volume data for a web service at a given time, which indicates whether load testing is occurring (e.g., if more than a threshold number of test users are active, then load testing is occurring, and unusually high resource instance counts should not be flagged as anomalies).

Advantageously, techniques described herein allow anomalies to be identified and addressed quickly, thereby saving costs, avoiding lost data and downtime, and improving reliability within a computing environment.

Example of Detecting and Preventing Web Service Usage Anomalies

Figure 1:
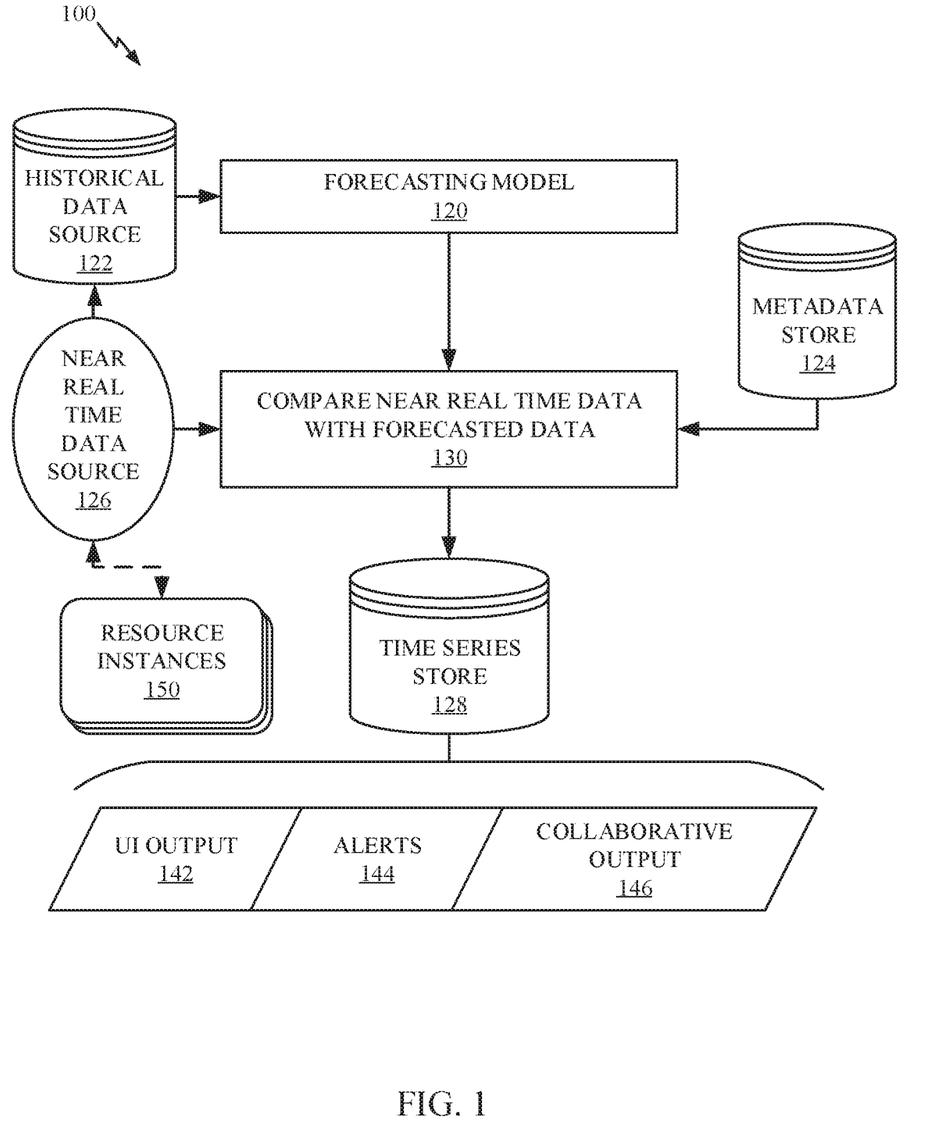
FIG. 1 depicts an example of detecting and preventing web service usage anomalies.

FIG. 1 illustrates an example 100 of detecting and preventing web service usage anomalies.

Forecasting model 120 generally represents a machine learning model. In some examples, forecasting model 120 may be a finite rank deep kernel learning model as described in the '601 application. In other embodiments, forecasting model 120 may be another type of machine learning model.

Historical data source 122 generally represents one or more data stores or services from which historical usage data related to a given application is retrieved. In certain embodiments, historical data source 122 includes historical CURs and historical near real time data (e.g., including resource instance counts from historical time periods).

In certain examples, training data for forecasting model 120 is generated from historical data source 122 by extracting features from the historical CURs and historical near real time data. The generated training data is then used to train forecasting model 120, such as using finite rank deep kernel learning techniques. In some embodiments, forecasting model 120 is trained as described in the '601 application. In some embodiments, forecasting model 120 is re-trained at regular intervals, such as weekly, as new historical usage data becomes available in historical data source 122.

Forecasting model 120 is used at regular intervals to forecast usage data, such as numbers of resource instances, upper limits, and lower limits, based on near real time data from a certain time period prior to the time for which the forecast is being made. In one example, forecasts are made hourly for the upcoming hour.

In this embodiment, near real time data source 126 represents a usage tracking service that continuously monitors numbers of resource instances 150 in use for a given application and provides frequent usage data, such as hourly. Resource instances 150 generally represent compute instances and/or storage instances that are in use. In some embodiments, near real time data from near real time data source 126 is stored in historical data source 122 as it becomes available.

In one example, the near real time data from a given number of hours prior to the time for which a forecast is being made is provided as input data to the trained forecasting model 120 in order to forecast numbers of resource instances and an upper and lower limit on resource instances for the time (e.g., for the next hour). Subsequently, once the next hour has passed, actual detected values for the hour are received from near real time date source 126, and are compared to the upper and lower limit that was forecasted for the hour. If an actual detected value exceeds the upper limit or falls below the lower limit, then an anomaly is determined to have occurred.

Metadata source 124 generally represents one or more data stores or services that provide metadata related to near real time data from near real time data source 126, such as context information. Context information may include, for example, test user volume data. Context information from metadata store 124 is used to further improve determinations regarding anomalies, such as based on user feedback.

In one example, a user previously indicated that a high number of resource instances that was identified as an anomaly was a false positive because the application was undergoing load testing. As such, a rule may specify that if context information indicates that the application is undergoing load testing (e.g., if test user volume is above a threshold), then higher numbers of resource instances should not be identified as anomalies. In some embodiments, rules are generated and applied by the same component that detects anomalies, such as anomaly prevention engine 616 of FIG. 6, described below.

At step 130, the near real time data for a given time is compared with forecasted data for the given time (in view of the context information and rules based on feedback) in order to detect anomalies. Step 130 may be performed, for example, by anomaly prevention engine 616 of FIG. 6, described below. Output from step 130 is stored in time series store 128, which generally represents a data store in which time series data (e.g., graphs of predicted and actual resource instance values over time) and anomaly data (e.g., indications of anomalies with associated details) are stored.

User interface (UI) output 124, alerts 144, and collaborative output 146 represent the different types of output that may be provided based on determinations made at stage 130. For example, UI output 142 may include indications and explanations of anomalies as well as visualizations of time series data from time series store 128. UI output 142 may be displayed via a user interface associated with the application.

Alerts 144 may include indications and explanations of anomalies, and may be provided via email or another communication medium.

Collaborative output 146 may include indications and explanations of anomalies, and may be provided via a collaborative communication platform, such as an instant messaging or chat application.

In some embodiments, UI output 142, alerts 144, and/or collaborative output 146 include a link to view additional information about an anomaly, such as a visualization, and a link to provide feedback related to an anomaly (e.g., indicating whether the anomaly was a false positive and why).

A user, such as an owner of an application for which usage is being tracked, may take remedial action based on UI output 142, alerts 144, and/or collaborative output 146. For instance, the user may realize that a high number of resource instances have mistakenly been used, and may take action to correct the mistake (e.g., by requesting that the number of resource instances be lowered by the service provider). In another example, the user may discover that an anomaly is caused by an error in the application, and may take action to correct the error.

Example Time Series Data

Figure 2:
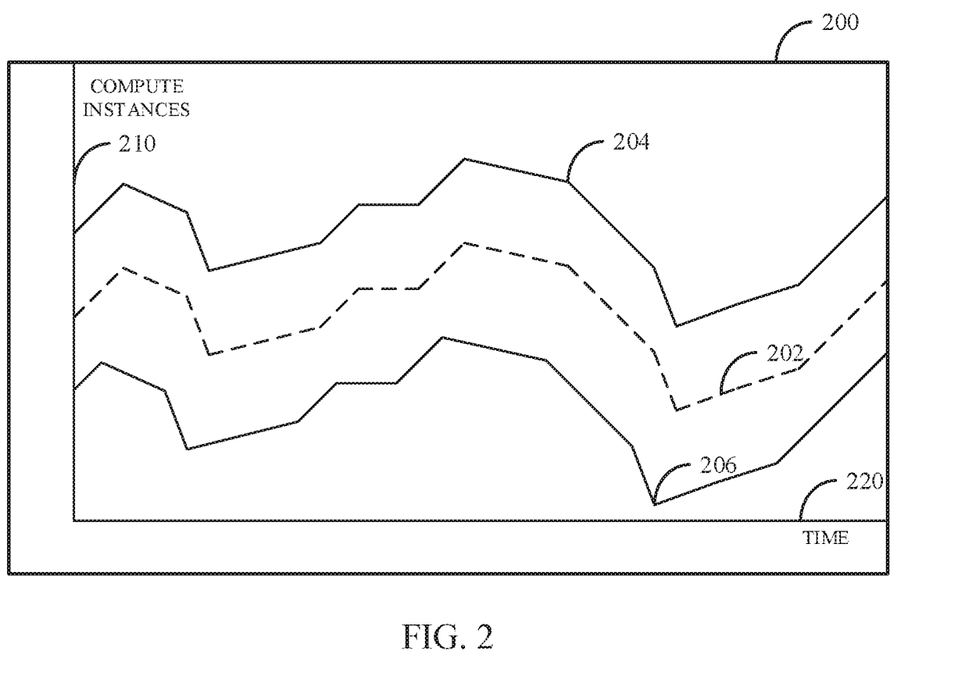
FIG. 2 depicts an example forecasted time series of web service usage data.

FIG. 2 depicts an example 200 of a forecasted time series of web service usage data. For example, the time series may comprise outputs from forecasting model 120 of FIG. 1 visualized as a graph.

Example 200 include time series curves plotted with respect to axis 210, which represents numbers of resource instances, and axis 220, which represents time (e.g., in hours). Curve 202 represents a time series of forecasted values of resource instances over time. Curve 204 represents forecasted upper limits associated with the values on curve 202, and curve 206 represents forecasted lower limits associated with the values on curve 202. In some embodiments, each upper and lower limit is a fixed offset from a given forecasted value of resource instances, or may be based on confidence intervals. In other embodiments, upper limits and lower limits are forecasted by forecasting model 120 of FIG. 1 along with the value of resource instances (e.g., based on the highest and lowest number of resource instances that historically occurred under similar conditions).

Figure 3:
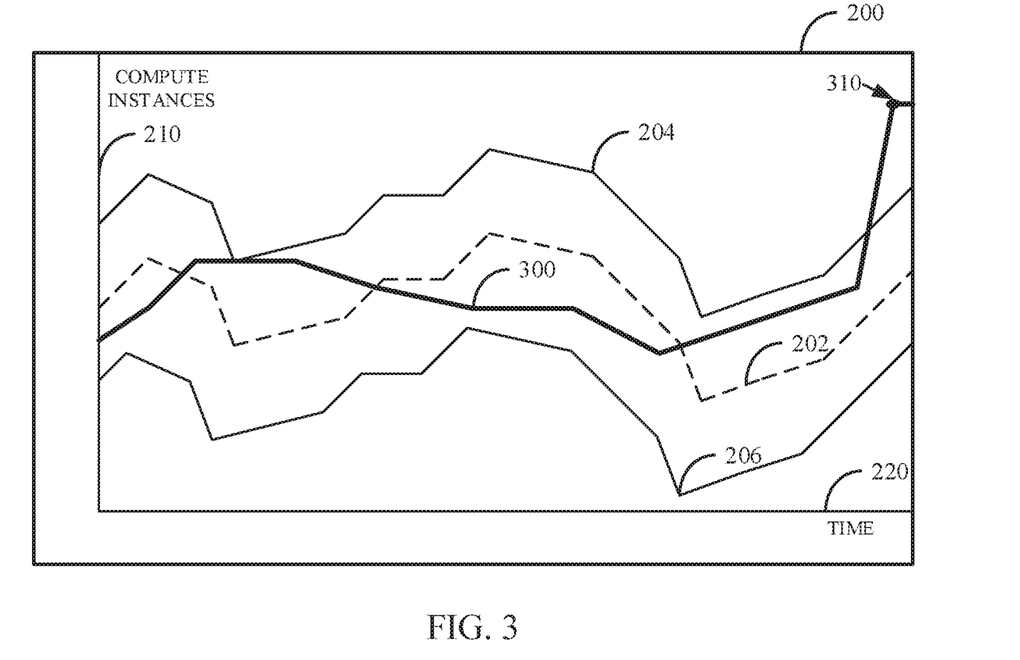
FIG. 3 depicts an example of overlaying near real time usage data onto a forecasted time series of web service usage data in order to detect and prevent anomalies.

FIG. 3 depicts example 200 of FIG. 2 with the addition of curve 300, which represents near real time data that is compared to the forecasted time series data in example 200.

For example, curve 300 may represent data received from near real time data source 126 of FIG. 1.

In an example, for each given time period (e.g., hour) the near real time data for the given time period (represented by points on curve 300) is compared to the forecasted upper bound (represented by points on curve 204) and the forecasted lower bound (represented by points on curve 206).

At time 310, curve 300 rises above curve 204, indicating that the near real time resource instance count at time 310 exceeded the forecasted upper limit on resource instance counts for time 310. As such, an anomaly is detected.

In some embodiments context information associated with the near real time resource instance count at time 310 is used to determine whether any rules indicate that the anomaly is a false positive. For example, if context information indicates that a number of test users at time 310 exceeded a threshold, then a rule (e.g., based on feedback) may specify that a higher resource instance count is not an anomaly, and so the anomaly may be discarded.

Assuming that no rule indicates that it is a false positive, the anomaly detected at time 310 may trigger generation of UI output 142, an alert 144, and/or collaborative output 146 of FIG. 1.

Example Anomaly Data

Figure 4:
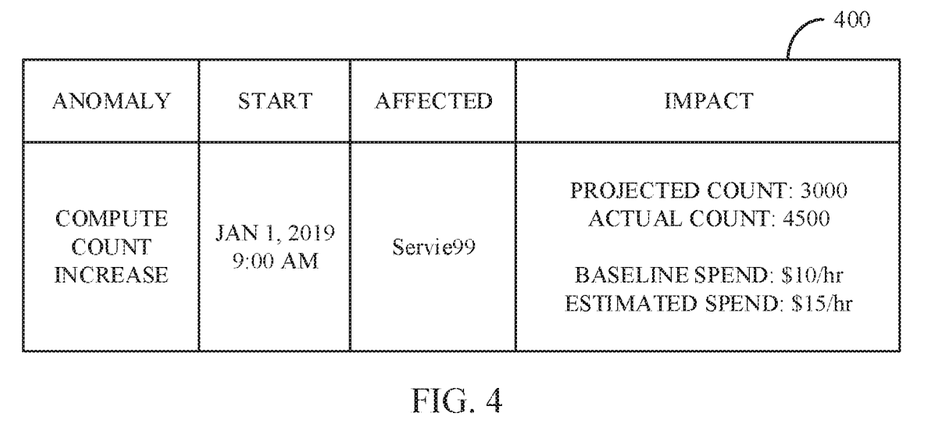
FIG. 4 depicts example anomaly data.

FIG. 4 depicts example anomaly data 400. For example, anomaly data 400 may represent the details of the anomaly detected at time 310 of FIG. 3, and may be provided to a user via UI output 142, an alert 144, and/or collaborative output 146 of FIG. 1.

Anomaly data 400 indicates that the anomaly of "COMPUTE COUNT INCREASE" started at 9:00 AM on Jan. 1, 2019, and affected "Service99". Anomaly data 400 further indicates the impact of the anomaly—in particular, that the projected resource instance count was 3000 while the actual resource instance count was 4500 and that the baseline spend is $10/hr, while the estimated spend based on the actual resource instance count is $15/hr. The baseline spend may be based on historical CURs, while the estimated spend may be based on both the actual resource instance count and the historical CURs. Accordingly, a user may be apprised of the estimated financial impact of the anomaly.

Anomaly data 400 may be provided as UI output 142 via a user interface, and may be displayed along with a visualization of the anomaly, such as shown in example 300 of FIG. 3. When provided as an alert 144, anomaly data 400 may be sent in an email along with a link to view additional information, such as a visualization, in a user interface and a link to provide feedback. When provided as collaborative output 146, anomaly data 400 may sent to a user via a chat or instant messaging interface, and may also include links to view additional information and/or provide feedback.

Example Operations for Detecting and Preventing Web Service Usage Anomalies

Figure 5:
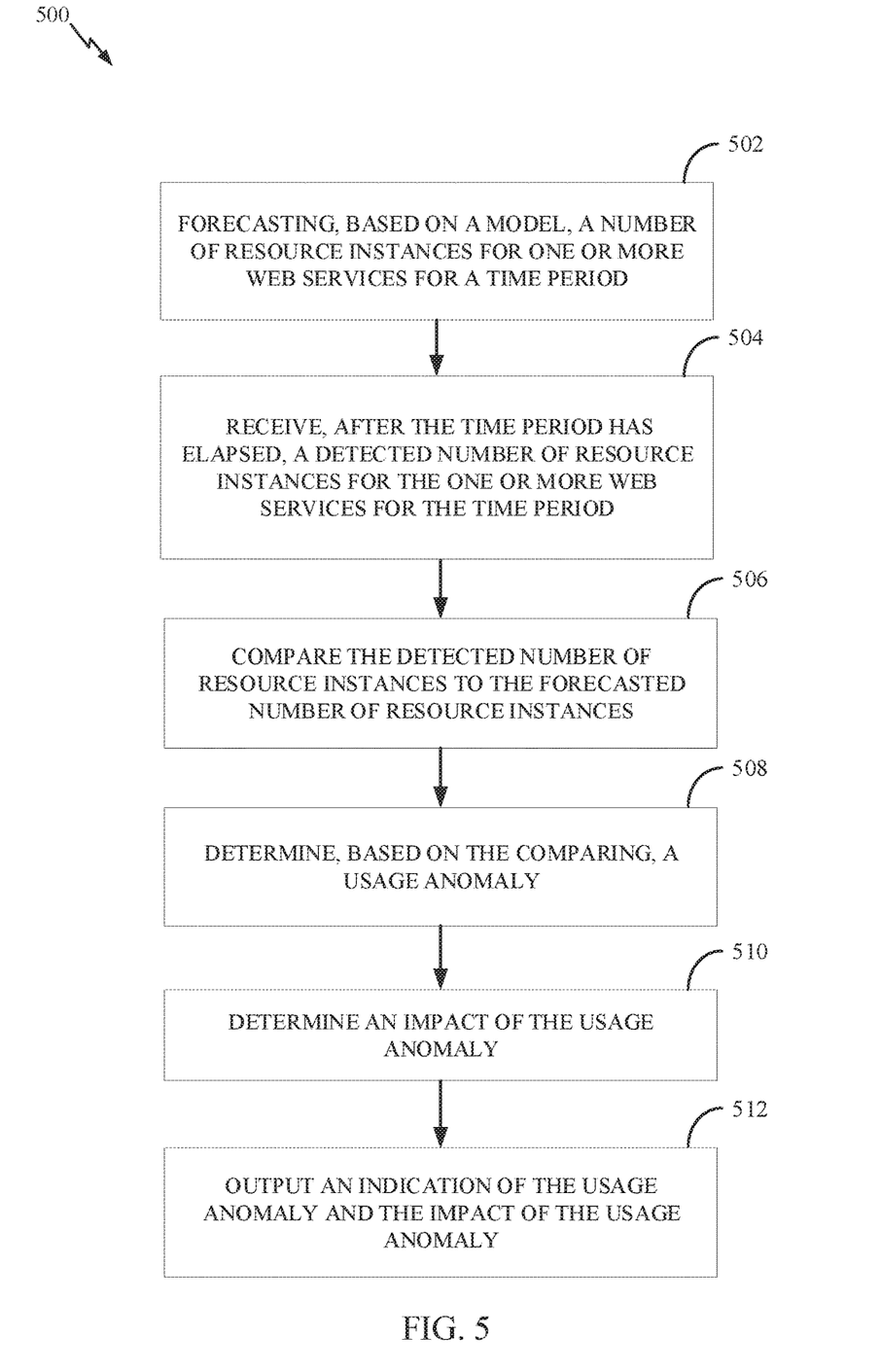
FIG. 5 depicts example operations for detecting and preventing web service usage anomalies.

FIG. 5 depicts example operations 500 for detecting and preventing web service usage anomalies. For example, operations 500 may be performed by anomaly prevention engine 616 of FIG. 6, which is described below.

At step 502, a model is used to determine a forecasted number of resource instances for one or more web services for a time period. In an example, forecasting model 120 of FIG. 1 is used to forecast a number of resource instances for the time period. Resource instances may be, for example, virtual computing instances (VCIs), such as virtual machines (VMs).

At step 504, a detected number of resource instances for the one or more web services for the time period is received after the time period has completed. In an example, the detected number of resource instances for the time period is received from near real time data source 126 after the time period has ended.

At step 506, the detected number of resource instances is compared to the forecasted number of resource instances. In an example, a value at time 310 on curve 300 of FIG. 3 is compared to the corresponding value at time 310 of curve 204 of FIG. 3, which represents a forecasted upper bound with respect to the forecasted number of resource instances.

At step 508, a usage anomaly is determined based on the comparing. In an example, an anomaly is detected if the detected value exceeds a forecasted upper bound or falls below a forecasted lower bound of forecasted resource instances for the time period.

At step 510, an impact of the usage anomaly for an owner of the one or more web services is determined. In some embodiments, the impact is a financial impact, and is determined based on cost information (e.g., historical CURs) and the detected number of resource instances for the time period.

At step 512, an indication of the usage anomaly and the impact of the usage anomaly is provided to the owner of the one or more web services. In an example, one or more of UI output 142, an alert 144, and/or collaborative output 146 of FIG. 1 are provided to the owner of the one or more web services, such as via a user interface, an email, a text message, a chat message, an instant message, and/or the like.

In some embodiments, an explanation of the usage anomaly is provided along with the indication of the usage anomaly and the indication of the impact of the usage anomaly. The explanation may indicate, for example, that the detected number of resource instances exceeded an upper bound with respect to the forecasted number of resource instances for the time period. In some embodiments, the owner of the one or more web services is provided with a link to view additional information about the usage anomaly, such as a visualization of the usage anomaly. In certain embodiments, the owner of the usage anomaly is also provided with a link to provide feedback, such as an indication of whether the usage anomaly is a false positive and a reason why the usage anomaly is a false positive In certain embodiments, operations 500 further comprise receiving feedback in response to the notification, wherein the feedback indicates whether the usage anomaly is a false positive.

In some embodiments, an action is taken to improve future anomaly detection based on the feedback. Taking the action to improve future anomaly detection based on the feedback may comprise one or more of: creating a rule based on the feedback; or re-training the model based on the feedback.

In some embodiments, the model is a finite rank deep kernel learning model.

In some embodiments, operations 500 further comprise receiving context information related to the detected value; and applying one or more rules to the context information to determine whether the usage anomaly is a false positive. In some embodiments, the one or more rules are based on feedback in response to past anomalies.

Example Computing System

Figure 6:
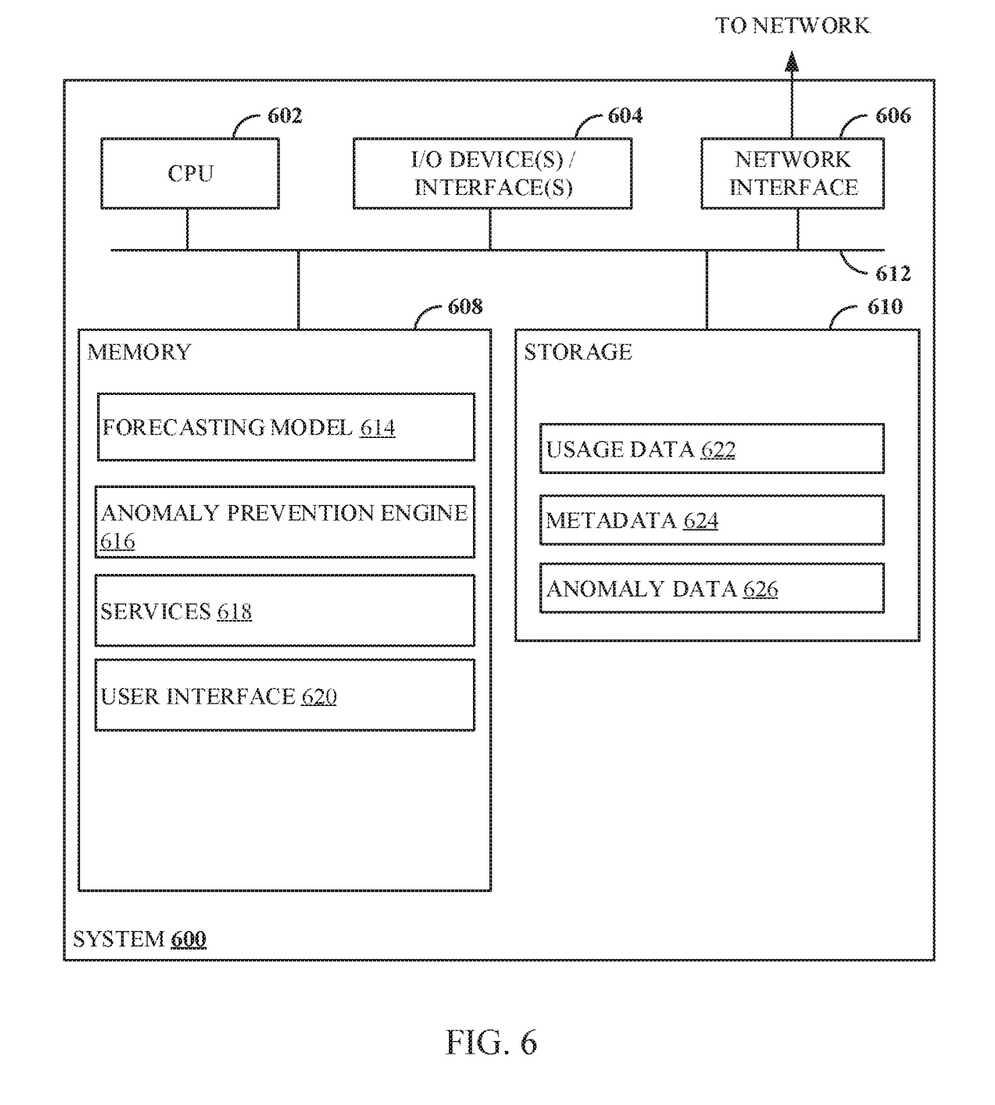
FIG. 6 depicts an example computer system with which embodiments of the present disclosure may be implemented.

FIG. 6 illustrates an example system 600 used for detecting and preventing failures in a homogenous cluster of systems. For example, system 600 may be representative of server 120 of FIG. 1.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises usage data 622, which may include data related to usage of one or more of service 618. In one example, usage data includes CURs and near real time data from historical data store 122 and near real time data source 126 of FIG. 1. Usage data further includes forecasted usage data, such as output by forecasting model 614. While usage data 622 is depicted in local storage of system 600, it is noted that usage data 622 may also be located remotely (e.g., at a location accessible over a network, such as the Internet). Storage 610 further includes metadata 624 includes context information related to usage data 622, such as test user volume data. In an example, metadata 624 is representative of the context information in metadata store 124 of FIG. 1. Storage 610 further includes anomaly data 626, which generally includes data related to anomalies. In an example, anomaly data 626 include anomaly data 400 of FIG. 4.

As shown, memory 608 includes forecasting model 614, which is generally representative of forecasting model 120 of FIG. 1. Memory 608 further includes anomaly prevention engine 616, which generally includes one or more web services for usage data is detected and forecasted as described herein. While certain embodiments are described with respect to web services, it is noted that techniques described herein may also be used to detect and prevent anomalies in usage of other types of computing applications. Memory 608 further includes user interface 620, which generally represents a user interface through which a user is provided data related to anomalies, such as UI output 142 of FIG. 1.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting and preventing web service usage anomalies, comprising:
   using a model to determine a forecasted number of resource instances for one or more web services for a time period;
   receiving a detected number of resource instances for the one or more web services for the time period, after the time period has completed;
   comparing the detected number of resource instances to the forecasted number of resource instances;
   determining, based on the comparing, a usage anomaly;
   determining whether the usage anomaly is a false positive based on a false positive rule, the false positive rule being generated in response to user feedback indicating that a detected anomaly was a false positive due to load testing, and the false positive rule involving a determination of whether the usage anomaly is a false positive based on a threshold number of active test user resource instances for the time period; and if the usage anomaly is not determined to be a false positive:

determining an impact of the usage anomaly for an owner of the one or more web services; and providing an indication of the usage anomaly and the impact of the usage anomaly to the owner of the one or more web services.

2. The method of claim 1, wherein the indication of the usage anomaly and the impact of the usage anomaly is provided to the owner of the one or more web services by one or more of:

user interface output;
an email alert;
a chat message; or
an instant message.

3. The method of claim 2, further comprising receiving additional feedback in response to the indication, wherein the additional feedback indicates that the usage anomaly is a false positive and indicates a reason for the false positive.

4. The method of claim 3, further comprising creating, based on the additional feedback, a rule that defines an exception based on the reason for the false positive.

5. The method of claim 1, further comprising:

receiving context information related to the detected number of resource instances, the context information including a number of active test user resource instances; and applying one or more rules to the context information to determine whether load testing occurred during the time period.

6. The method of claim 1, wherein the model comprises a finite rank deep kernel learning model.

7. The method of claim 1, wherein determining the impact of the usage anomaly on the owner of the one or more web services comprises using cost information and the detected number of resource instances to determine a cost estimate related to the usage anomaly.

8. A method for detecting and preventing web service usage anomalies, comprising:

receiving, by a computing device from a usage tracking service, a plurality of usage values related to a web service, wherein each respective usage value of the plurality of usage values is associated with a respective time period of a plurality of sequential time periods;

determining, by the computing device, a forecasted usage value for a given time period immediately following the plurality of sequential time periods by:

providing the plurality of usage values as inputs to a forecasting model; and receiving the forecasted usage value as an output from the forecasting model;

receiving, by the computing device from the usage tracking service, a detected usage value for the given time period;

determining, by the computing device, that the detected usage value is a usage anomaly based on the forecasted usage value;

determining whether the usage anomaly is a false positive based on a false positive rule, the false positive rule being generated in response to user feedback indicating that a detected anomaly was a false positive due to load testing, and the false positive rule involving a determination of whether the usage anomaly is a false positive based a threshold number of active test user resource instances for the time period; and if the usage anomaly is not determined to be a false positive:

identifying, by the computing device, at least one alert recipient based on a recipient list associated with the web service; and transmitting, by the computing device, an alert regarding the usage anomaly to the at least one recipient, wherein the alert comprises:

a first link to view additional information related to the alert; and a second link to provide feedback related to the alert.

9. The method of claim 8, wherein the first link, when activated, causes a visualization of the usage anomaly to be displayed via a graphical user interface.

10. The method of claim 8, wherein the second link, when activated, allows the at least one recipient to provide an indication of whether the usage anomaly is a false positive and an indication of a reason that the usage anomaly is a false positive.

11. The method of claim 9, further comprising receiving additional feedback from the at least one recipient via the second link and creating, based on the feedback, a rule that defines an exception based on the additional feedback.

12. The method of claim 8, further comprising:

receiving, by the computing device from the usage tracking service, a plurality of additional usage values for the web service;

performing re-training in order to produce a re-trained model based on the additional usage values; and determining whether to replace the forecasting model with the re-trained model based on one or more model quality metrics.

13. The method of claim 12, wherein the one or more model quality metrics comprise one or more of:

a negative log-likelihood; or
a normalized root mean squared error (NRMSE).

14. A system, comprising one or more processors and a non-transitory computer-readable medium comprising instructions that, when executed by the one or more processors, cause the system to:

use a model to determine a forecasted number of resource instances for one or more web services for a time period;

receive a detected number of resource instances for the one or more web services for the time period, after the time period has completed;

compare the detected number of resource instances to the forecasted number of resource instances;

determine, based on the comparing, a usage anomaly;

determine whether the usage anomaly is a false positive based on a false positive rule, the false positive rule being generated in response to user feedback indicating that a detected anomaly was a false positive due to load testing, and the false positive rule involving a determination of whether the usage anomaly is a false positive based on a threshold number of active test user resource instances for the time period being exceeded; and if the usage anomaly is not determined to be a false positive:

determine an impact of the usage anomaly for an owner of the one or more web services; and provide an indication of the usage anomaly and the impact of the usage anomaly to the owner of the one or more web services.

15. The system of claim 14, wherein the indication of the usage anomaly and the impact of the usage anomaly is provided to the owner of the one or more web services by one or more of:

user interface output;

an email alert;

a chat message; or an instant message.

16. The system of claim 15, wherein the instructions, when executed by the one or more processors, further cause the system to receive additional feedback in response to the indication, wherein the additional feedback indicates that the usage anomaly is a false positive and indicates a reason for the false positive.

17. The system of claim 16, wherein the instructions, when executed by the one or more processors, further cause the system to create, based on the additional feedback, a rule that defines an exception based on the reason for the false positive.

18. The system of claim 14, wherein the instructions, when executed by the one or more processors, further cause the system to:

receive context information related to the detected number of resource instances, the context information including a number of active test user resource instances; and apply one or more rules to the context information to determine whether load testing occurred during the time period.

19. The system of claim 14, wherein the model comprises a finite rank deep kernel learning model.

20. The system of claim 14, wherein determining the impact of the usage anomaly on the owner of the one or more web services comprises using cost information and the detected number of resource instances to determine a cost estimate related to the usage anomaly.

* * * * *